United States Patent
Anderson

(12) 
(10) Patent No.: US 6,269,872 B1
(45) Date of Patent: Aug. 7, 2001

(54) SYSTEM AND METHOD FOR REGULATING COOLANT FLOW RATE TO A HEAT EXCHANGER

(75) Inventor: John Stiles Anderson, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/172,426

(22) Filed: Oct. 14, 1998

(51) Int. Cl.[7] .................................................. F04B 49/00
(52) U.S. Cl. ........................... 165/271; 165/244; 165/41; 165/97; 237/12.3 B; 237/2 A; 237/8 A; 417/2; 417/43; 417/205; 417/426
(58) Field of Search .................................... 165/271, 244, 165/97, 41; 237/12.3 B, 2 A, 8 A; 417/2, 43, 205, 426

(56) References Cited

U.S. PATENT DOCUMENTS

| | | | |
|---|---|---|---|
| 2,520,650 | * | 8/1950 | Olshei et al. ............................. 417/2 |
| 2,560,306 | * | 7/1951 | Rappl ....................................... 417/2 |
| 2,641,107 | * | 6/1953 | Rappl ....................................... 417/2 |
| 3,999,598 | | 12/1976 | Fehr et al. . |
| 4,058,255 | | 11/1977 | Linder et al. . |
| 4,955,431 | * | 9/1990 | Saur et al. ............................ 165/271 |
| 4,974,664 | | 12/1990 | Glennon et al. . |
| 5,085,267 | * | 2/1992 | Torrence ............................... 165/271 |
| 5,269,660 | | 12/1993 | Pradelle . |
| 5,271,361 | * | 12/1993 | Flynn ....................................... 417/2 |
| 5,458,185 | | 10/1995 | Mizuno . |
| 5,736,823 | | 4/1998 | Nordby et al. . |

FOREIGN PATENT DOCUMENTS

| | | |
|---|---|---|
| 0069802 | 6/1979 | (JP) . |
| 0074015 | 4/1986 | (JP) . |
| 405223027A | 8/1993 | (JP) . |

OTHER PUBLICATIONS

Selected Exerpt of Bosch Electric Motors Publication Aftermarket Program 97/98 PCA Water Circulating Pump with Electric Motor, 1997.*

* cited by examiner

Primary Examiner—John K. Ford
(74) Attorney, Agent, or Firm—Larry I. Shelton

(57) ABSTRACT

A method for regulating coolant flow rate to a heat exchanger in an automotive vehicle is described. The method includes the steps of providing a main fluid pump for providing a source of fluid under pressure to the vehicle engine and the heat exchanger and providing a reversible flow auxiliary pump between the main fluid pump and the heat exchanger. The method further includes the steps of generating an engine speed signal and an ambient temperature signal. The auxiliary pump forces fluid against the flow from the main fluid pump when the engine speed signal is greater than a threshold value and forces fluid to the heat exchanger when the ambient temperature signal is below a predetermined value and the engine speed signal is less than the threshold value and within predetermined values. A system is also disclosed for accomplishing the method.

14 Claims, 4 Drawing Sheets

SYSTEM AND METHOD FOR REGULATING COOLANT FLOW RATE TO A HEAT EXCHANGER

BACKGROUND OF THE INVENTION

1. Field of the Invention

The present invention relates generally to a method for regulating the flow of coolant to a heat exchanger in an automotive vehicle. More particularly, the present invention relates to a method wherein a reversible-flow pump is used in conjunction with a main fluid pump to regulate the coolant flow.

2. Disclosure Information

As automotive engines become increasingly more efficient, the amount of waste heat produced is being minimized. One result of this efficiency is that it is becoming more difficult to heat the passenger compartment of the vehicle. Auxiliary heaters, such as fuel fired heaters, and systems such as exhaust heat recovery systems which use heat recovered from the exhaust system of the vehicle are being used to warm the vehicle passenger cabin. However, these solutions tend to be expensive.

Another solution to the problem of providing more heat to a vehicle passenger compartment is to increase the amount of heated water sent to a heat exchanger, typically a heater core, over which ambient or recirculated air is passed prior to entering the cabin. In a typical heating system, a "water pump" circulates coolant through the vehicle engine to cool the engine. The coolant becomes hot and is directed to the heater core. A valve may regulate the amount of coolant entering the core. Air is passed over the core and becomes warm. The speed of the pump is controlled by the speed of the engine. As the engine speed increases, the amount of fluid delivered by the pump increases. This increase in fluid delivered to the heater core can damage the core due to erosion from the high velocity of the flow.

Current automotive industry practice for controlling fluid flow to the heater core to minimize erosion is to insert a variable restriction device or a bypass valve to reduce coolant flow at high engine speed. FIG. 1 shows the general relationship between heater core output (in BTUs) and coolant flow rate (in gallons per minute). As shown in FIG. 1, for optimum heater performance, the coolant supply should be about four gallons per minute. A flow rate greater than four gallons per minute will have little or no performance benefit while flow rates above eight gallons per minute may cause erosion of the heater core. The heater core will function adequately at a flow rate of between 2–4 gallons per minute. At flow rates below two gallons per minute, the heating system will not provide enough heat to maintain cabin comfort under all conditions. This condition occurs when the engine speed drops below about 1000 rpm in vehicles with fluid flow restrictors because the restrictor impedes fluid flow at all times. Vehicle occupants will notice the interior temperature drop when idling at a stop light and defroster performance will be poor.

Therefore, there is a need for a method and system for regulating coolant flow to a heater core which will provide adequate flow rates for producing adequate heat without damaging the heater core. It is an object of the present invention to provide a system which eliminates mechanical restriction devices so that increased fluid flow is produced at low engine speeds but which prevents heater core erosion at high engine speeds.

SUMMARY OF THE INVENTION

The present invention overcomes the problems associated with the prior art by providing a method for regulating coolant flow rate to a heat exchanger in an automotive vehicle having an engine operating at different speeds. The method comprises the steps of providing a main fluid pump for providing a source of fluid under pressure to the engine and the heat exchanger, and providing a reversible flow auxiliary pump fluidly connected with the main fluid pump and the heat exchanger. The method further comprises the steps of measuring engine speed and generating an engine speed signal and measuring ambient temperature and generating an ambient temperature signal. The method also includes activating the auxiliary pump to force fluid against the flow from the main fluid pump when the engine speed signal is greater than a threshold value and to force fluid to the heat exchanger when the ambient temperature signal is below a predetermined value and the engine speed signal is less than the threshold value and within predetermined values.

A system for regulating coolant flow rate to a heat exchanger in an automotive vehicle having an engine operating at different speeds is also disclosed. The system comprises a main fluid pump for providing a source of fluid under pressure to the engine and the heat exchanger and a reversible-flow auxiliary pump fluidly connected with the main fluid pump and the heat exchanger. The system further includes means for measuring engine speed and generating an engine speed signal, means for measuring ambient temperature and generating an ambient temperature signal, and control means for receiving the engine speed signal and the ambient temperature signal. The control means activates the auxiliary pump to force fluid against the flow from the main fluid pump when the engine speed signal is greater than a threshold value and to force fluid to the heat exchanger when the ambient temperature signal is below a predetermined value and the engine speed signal is less than the threshold value and within predetermined values.

It is an advantage of the present invention that heater core erosion is substantially eliminated and high heat is produced at low engine speed. These and other features, objects and advantages will become apparent from the drawings, detailed description and claims which follow.

DETAILED DESCRIPTION OF THE PREFERRED EMBODIMENTS

Figure 2:
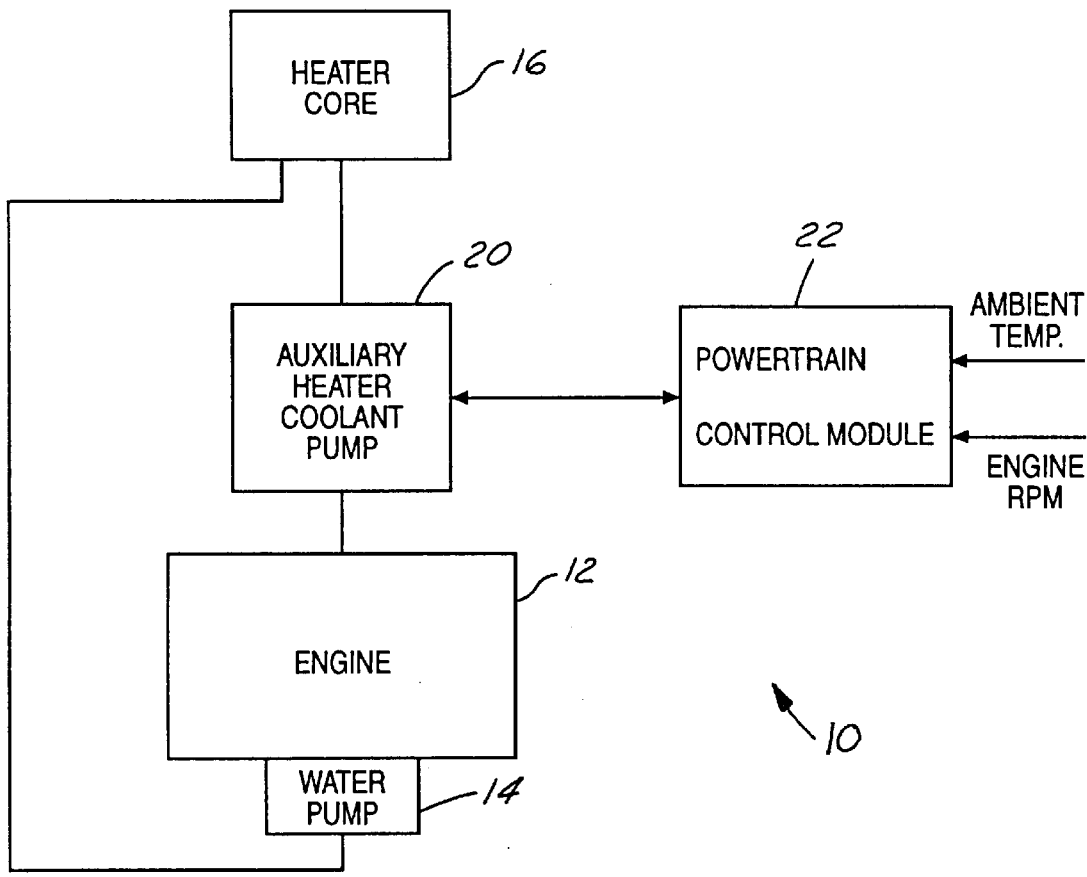
FIG. 2 is a schematic block diagram of a system according to the present invention.

Referring now to the drawings, FIG. 2 shows a schematic representation of an engine cooling/heating system coolant flow circuit of the present invention. The system 10 includes a vehicle engine 12 having a main fluid pump 14, commonly referred to as a "water pump", for forcing a coolant fluid through the engine to keep the engine from overheating. The main pump 14 forces coolant through various passageways in the engine block as well as to a heat exchanger 16. The heat exchanger 16 typically is a heater core. By fluid to air heat exchange, the heater core 16 provides warm air to the vehicle passenger cabin. The main pump 14 also pumps coolant to another heat exchanger, the radiator (not shown) for cooling the coolant entering the engine block as is commonly known.

Figure 5:
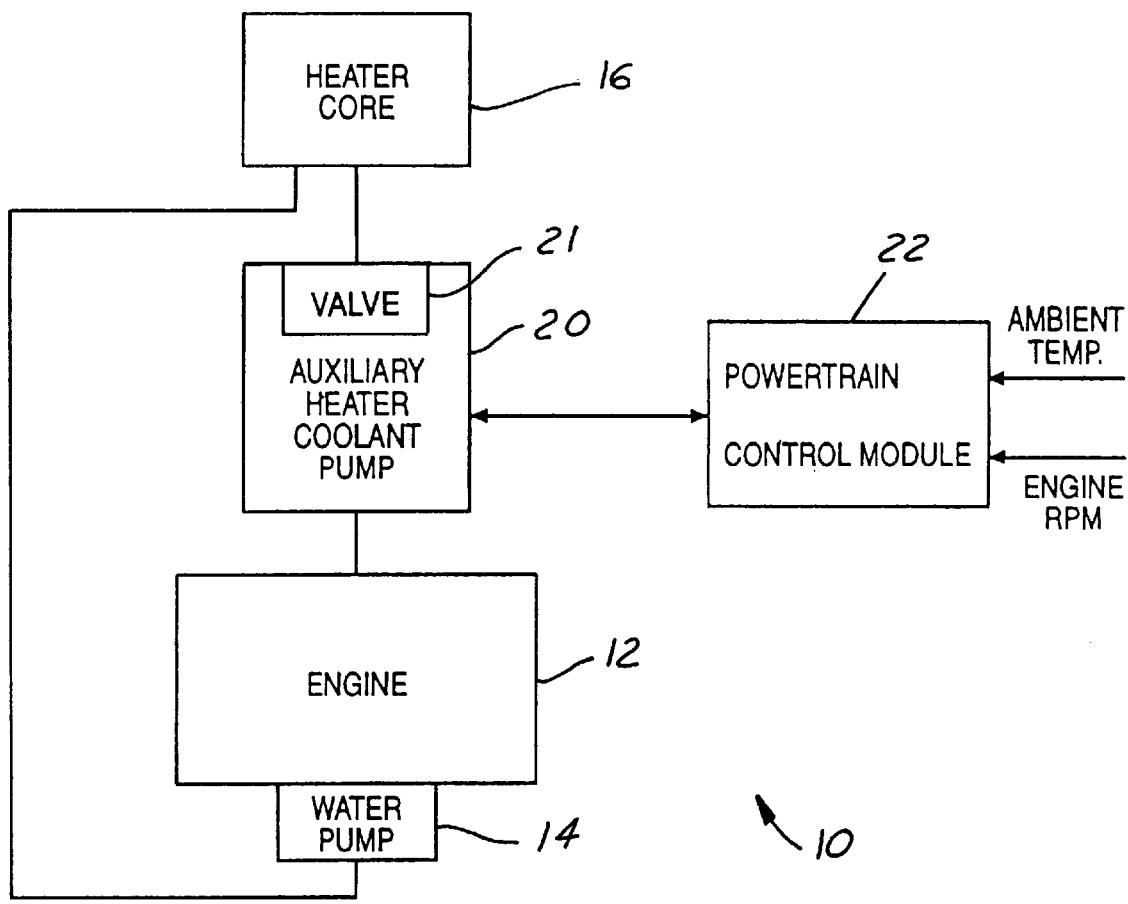
FIG. 5 is a schematic block diagram of a system with a valve inside the pump according to the present invention.

The system 10 of the present invention includes an auxiliary fluid pump 20. Auxiliary pump 20 is a reversible-flow type pump which provides fluid flow in either of two directions. A valve 21 may be included inside the auxiliary pump 20 as shown in FIG. 5. The flow rate of fluid from the auxiliary pump 20 can be variably controlled in response to the speed of the engine. As shown in FIG. 2, the auxiliary pump is fluidly connected in series with the main pump 14 and the heater core 16. An example of such a reversible-flow type pump is a model P.C.A. pump commercially available from the Robert Bosch Company. This pump uses a magnetically activated rotor for pumping fluid. The rotational direction of the rotor determines the fluid flow direction and is easily changed by changing the polarity of the signal to the motor.

The auxiliary pump 20 is electrically connected to an engine control module 22. The engine control module 22 receives an ambient temperature signal from a thermistor located outside of the engine compartment as well as an engine speed signal measuring the revolutions per minute (RPM) of the engine. The control module 22 uses these signals in determining when the auxiliary pump should be activated.

Figure 3:
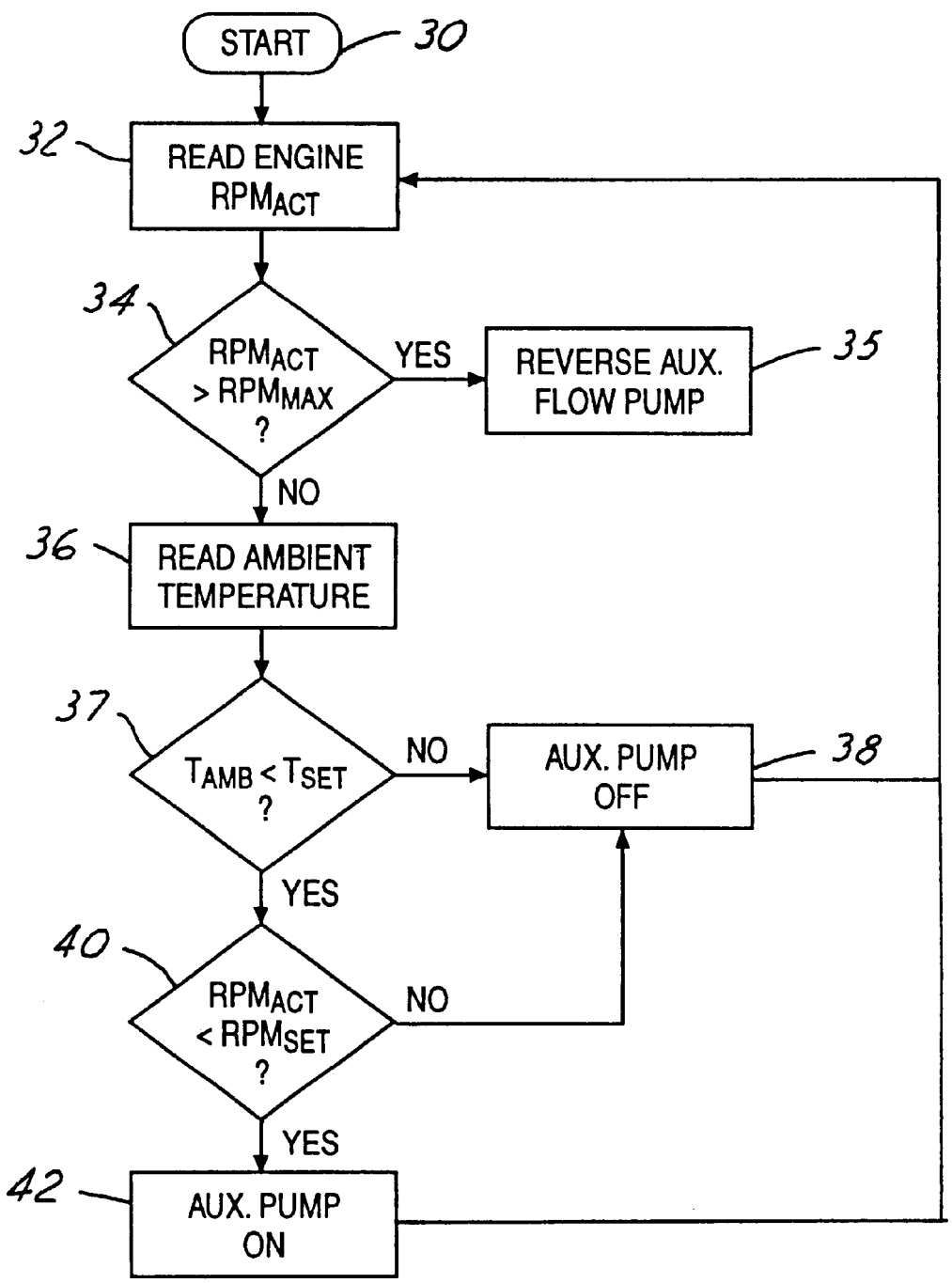
FIG. 3 is a flow chart of the method of the present invention.

FIG. 3 is a flow chart indicating the method of the present invention. After the vehicle has been started and the method initiated at start block 30, the control module 22 will read the engine speed signal ($RPM_{ACT}$) at block 32. Measuring the engine speed directly correlates to the velocity of the fluid exiting the main pump 14 since the pump is driven by the engine in a known manner. If the measured engine speed signal, $RPM_{ACT}$, is greater than a maximum threshold value, $RPM_{MAX}$, (at block 34) then the flow of the auxiliary pump is reversed (block 35) such that it flows against or in the opposite direction to the fluid flow from the main pump 14. In this manner, the velocity of the flow from the main pump 14 can be decreased to negate any erosion effects that the flow may cause. In the preferred embodiment, $RPM_{MAX}$ is approximately 2800 RPM but the value may be different for different vehicle applications.

If the actual speed signal is less than $RPM_{MAX}$ at block 34, then the control module reads the ambient temperature signal, $T_{AMB}$, at block 36. If the ambient temperature is greater than a predetermined value, $T_{SET}$ (block 37) the auxiliary pump 20 is not initiated (block 38) since no additional cabin heating is required. If the ambient temperature is less than $T_{SET}$ the control module will then determine whether the engine speed signal is below a predetermined value, $RPM_{SET}$. If the engine speed is greater than $RPM_{SET}$ (block 40) then the auxiliary pump is not initiated because there is sufficient flow from the main pump 14 to the heater core for cabin heating if desired, without causing erosion of the core due to high velocity flow. In the preferred embodiment, the threshold value, $RPM_{SET}$, for engine speed is approximately 1000 RPM and $T_{SET}$ is approximately 25° F. However, this value will be calibrated for a specific vehicle.

If at block 40 $RPM_{SET}$ is greater than $RPM_{ACT}$, and $T_{AMB}$ is less than $T_{SET}$, then the control module 22 will start the auxiliary pump 20 (block 42) to increase the flow of fluid to the heater core to increase cabin heating. This situation would occur when the ambient temperature is cold, less than 25° F. and the engine is idling (less than 1000 RPM). In this condition, the main pump 14 does not provide enough fluid to the heater core to maintain a desired warm temperature. By using the auxiliary pump 20, more fluid is passed through the heater core, thus increasing the heat transfer from the coolant to provide warmer airflow to the passenger cabin.

Figure 4:
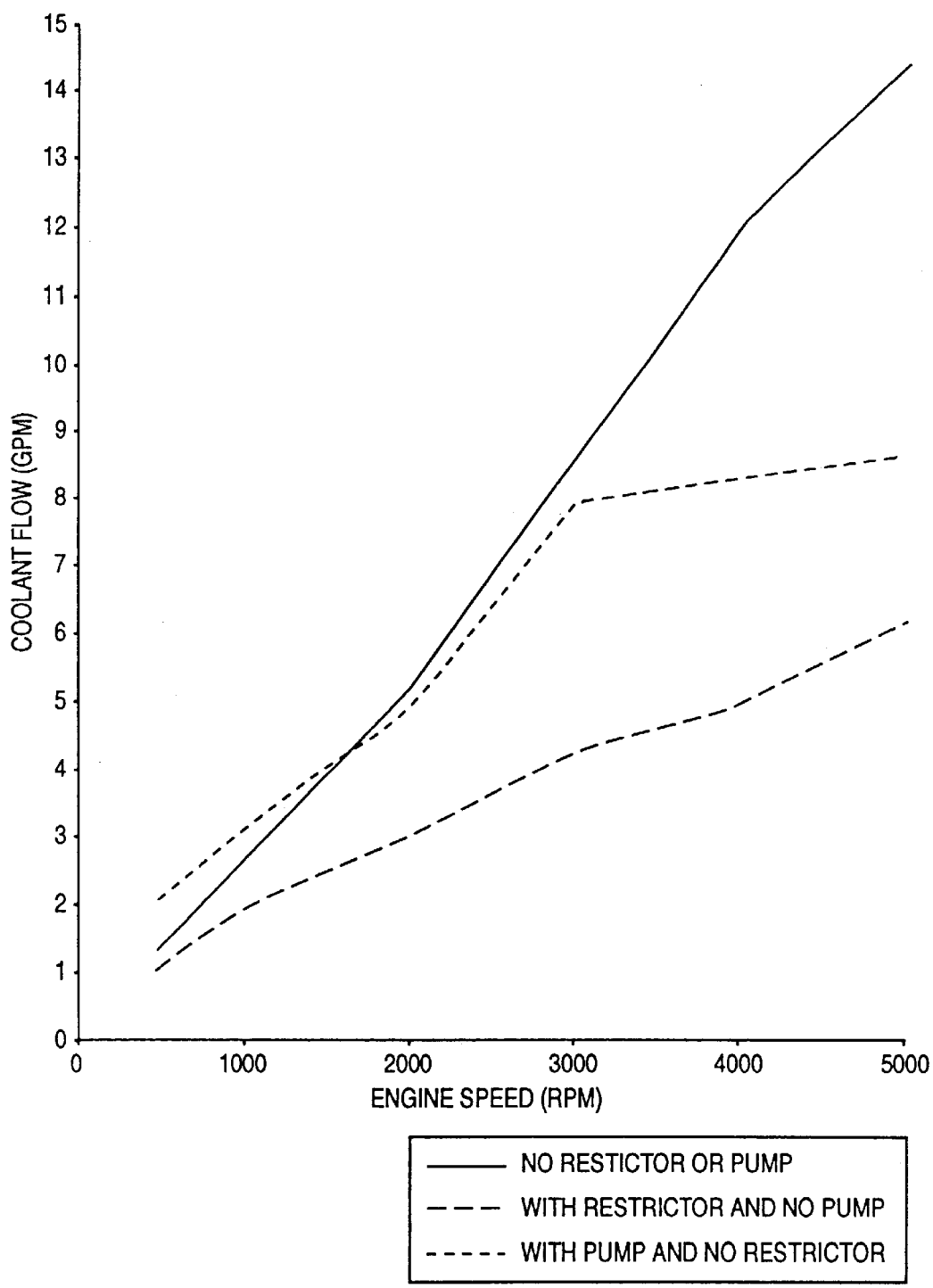
FIG. 4 is a graphical representation of empirical studies comparing standard heating systems compared to the performance of the present invention.

FIG. 4 shows the results of empirical data for three different cooling systems measuring coolant flow (gallons per minute) against vehicle engine speed (revolutions per minute). The solid line represents a system having no restrictor or auxiliary pump. The long-dashed line represents a system having a restrictor in the fluid pathway between the main pump and the heater core, but not having an auxiliary pump. The short-dashed line represents the system of the present invention having an auxiliary pump and no restrictor. As expected, in a system with no restrictor or pump, the coolant flow increases almost linearly as the engine speed increases. This causes very high coolant flow at high engine speed, often leading to heater core failure from the erosion effects of the high flow velocity.

In the system with a restrictor but no auxiliary pump, the high coolant flow velocity is eliminated at high engine speed, reducing erosion effects. However, at low engine speeds, the restrictor still impedes the coolant flow to the heater core. Coolant flow at engine speeds below 1000 RPM is approximately one GPM or less. This low flow does not provide enough heated fluid to the heater core to ensure desired passenger cabin heating.

Figure 1:
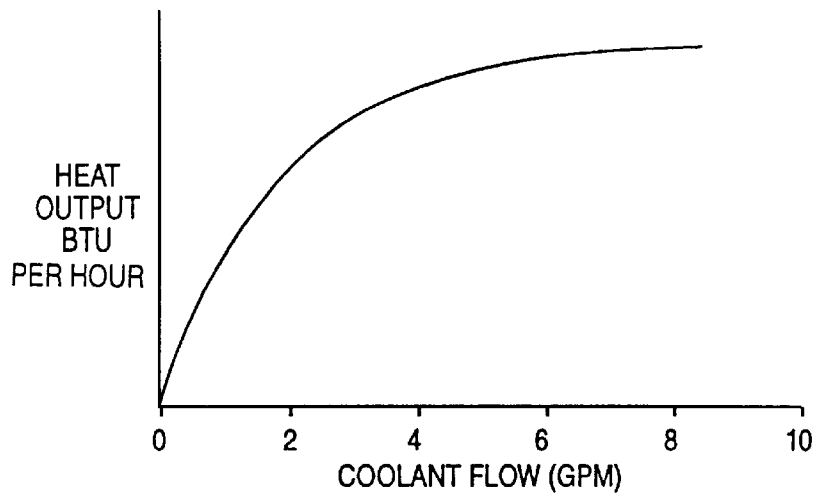
FIG. 1 is a graphical representation of the effects of coolant flow rate on heat produced for automotive vehicles.

In the system of the preferred embodiment, the auxiliary pump provides additional flow to the heater core at low engine speeds and reduces coolant flow at high engine speeds by reversing directions to pump fluid against the flow from the main pump. As discussed above with reference to FIG. 1, a flow rate of two GPM provides a great increase in the heat output of the heater core. The auxiliary pump of the present systems provides these benefits.

It will become apparent to those skilled in the art that many variations of the present invention are possible. It is the following claims, including all equivalents which define the scope of the invention.

What is claimed is:

1. A method for regulating coolant flow rate to a heat exchanger in an automotive vehicle having an engine operating at different speeds comprising the steps of:

providing a main fluid pump for providing a source of fluid under pressure to the engine and the heat exchanger;

providing a reversible flow auxiliary pump disposed between the main fluid pump and the heat exchanger;

measuring engine speed and generating an engine speed signal;

measuring ambient temperature and generating an ambient temperature signal; and activating the auxiliary pump to force fluid against the flow from said main fluid pump when the engine speed signal is greater than a threshold value.

2. A method according to claim 1, further including the step of activating the auxiliary fluid pump to force fluid to the heat exchanger when the ambient temperature signal is below a predetermined value and the engine speed signal is less than the threshold value and within predetermined values.

3. A method according to claim 2, further including the step of providing a valve in the auxiliary pump and variably controlling the flow rate of fluid from the auxiliary pump in response to the engine speed.

4. A method according to claim 1, wherein the engine speed threshold value is approximately 2800 revolutions per minute.

5. A method according to claim 2, wherein the ambient temperature value is approximately 25° F.

6. A method according to claim 5, wherein the predetermined engine speed signals are between 1000 and 2800 revolutions per minute.

7. A method for regulating coolant flow rate to a heat exchanger in an automotive vehicle having an engine operating at different speeds comprising the steps of:

provinding a main fluid pump for providing a source of fluid under pressure to the engine and the heat exchanger;

providing a reversible flow auxiliary pump disposed between main fluid pump and the heat exchanger;

measuring engine speed and generating an engine speed signal;

measuring ambient temperature and generating an ambient temperature signal; and activating the auxiliary pump to force fluid against the flow from said main fluid pump when the engine speed signal is greater than a threshold value and to force fluid to the heat exchanger when the ambient temperature signal is below a predetermined value and the engine speed signal is less than the threshold value and within predetermined values.

8. A method according to claim 7, wherein the engine speed threshold value is approximately 2800 revolutions per minute.

9. A method according to claim 8, wherein the ambient temperature value is approximately 25° F.

10. A method according to claim 9, wherein the predetermined engine speed signals are between 1000 and 2800 revolutions per minute.

11. A system for regulating coolant flow rate to a heat exchanger in an automotive vehicle having an engine operating at different speeds, comprising:

a main fluid pump for providing a source of fluid under pressure to the engine and the heat exchanger;

a reversible flow auxiliary pump disposed between the main fluid pump and the heat exchanger;

means for measuring engine speed and generating an engine speed signal;

means for measuring ambient temperature and generating an ambient temperature signal; and control means for receiving said engine speed signal and said ambient temperature signal and activating the auxiliary pump to force fluid against the flow from said main fluid pump when the engine speed signal is greater than a threshold value and to force fluid to the heat exchanger when the ambient temperature signal is below a predetermined value and the engine speed signal is less than the threshold value and within predetermined values.

12. A system according to claim 11, wherein the engine speed threshold value is approximately 2800 revolutions per minute.

13. A system according to claim 12, wherein the ambient temperature value is approximately 25° F.

14. A system according to claim 13, wherein the predetermined engine speed signals are between 1000 and 2800 revolutions per minute.

* * * * *